Figure 1:
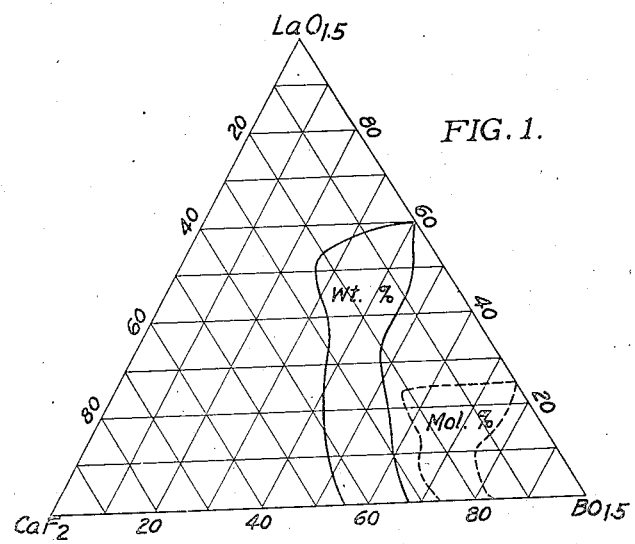

Patented Dec. 14, 1948

2,456,033

UNITED STATES PATENT OFFICE 2,456,033

FLUOBORATE GLASS

Kuan-Han Sun, Rochester, N. Y., assignor to Eastman Kodak Company, Rochester, N. Y., a corporation of New Jersey Application February 9, 1946, Serial No. 646,681

11 Claims. (Cl. 106—47)

This invention relates to glasses having novel and desirable optical properties, and specifically to fluoborate glasses. Such glasses have a refractive index which is higher for the same Abbe value ($\nu$), between 54 and 68, than any previously described glasses known to me.

While borate glasses containing fluoride have been reported in the literature, the amount of fluoride present has usually been small and has in almost every case been introduced as the fluoride of an alkali metal. The presence of alkali fluoride in substantial quantities imparts to the glass optical properties which are inferior for lens design and for chemical and physical durability.

The fluoborate glasses herein disclosed contain little or no alkali, but contain in combined form boron, oxygen lanthanum, and fluorine and one or more of the following metallic elements: beryllium, magnesium, calcium, zinc, strontium, cadmium, barium, divalent lead, silicon, titanium, thorium, columbium, and tantalum, with an atomic or ionic ratio of fluorine to boron up to about 1.3.

The general formula of these glasses may be represented by the following notation:

$$MF_x\text{—}RO_y\text{—}BO_{1.5}$$

in which $MF_x$ represents one or more of the fluorides of the above enumerated metals, $RO_y$ represents one or more of the oxides of the same metals.

Since $Be_2O_3$, $La_2O_3$, $Ta_2O_5$, etc., are empirical formulas, it is equally expedient and more convenient, particularly in using "cationic" percentage or electropositive atomic percentage, to adopt the form $BO_{1.5}$, $LaO_{1.5}$, $TaO_{2.5}$, etc. In designating a glass batch, it is convenient from the experimental point of view to indicate in weight percentages the actual individual constituents used. However, from the theoretical point of view a fluoborate glass batch is better represented by the "cationic" percentage and the atomic or ionic ratio of fluorine to boron. The "cationic" percentage or the electropositive atomic percentage is the same as the mole percentage if all the "molecular formulas" of the fluorides and oxides are expressed in such a way that they contain only one metallic "atom" or "ion."

Although a glass may be formed from a batch containing the various ingredients as expressed in the batch formulas, these individual ingredients do not in fact exist as such in the final product. It is more nearly correct to consider these glasses as an irregular aggregate of positive and negitive ions (such as $Ca^{++}$, $La^{+++}$, $Th^{++}$, $B^{+++}$, $O^{--}$, $F^{-}$, etc.), although the forces between adjacent atoms or ions are by no means purely ionic.

It is apparent from the above discussion that, in order to make a glass such as one of the calcium-lanthanum-fluoborate type, one could use the combination of components indicated by any of the following systems: $CaF_2$—$LaO_{1.5}$—$BO_{1.5}$; $CaO$—$LaF_3$—$BO_{1.5}$; or $$CaO\text{—}LaO_{1.5}\text{—}CaF_2\text{—}LaF_3\text{—}BO_{1.5}$$

Similarly a glass made from $LaF_3$ and $BO_{1.5}$ with or without other ingredients, would contain also $LaO_{1.5}$ and $BF_3$.

In the following tables are given numerous examples of batch formulas yielding fluoborate glasses within the scope of my inventions and discoveries. In each of them the various components are given in both weight and "cationic" or "mole" percentages, the former being given under the letter W, and the latter under M. The fluorine to boron ratio, F/B, is also given for each example. Since the volatilization loss in most of the cases is slight, the compositions of the final glasses are not greatly different from those of the batches from which they are produced. The refractive index for the D line, $n_D$, and the Abbe value, $\nu$, are also given.

The first table includes examples of simple binary systems including lanthanum fluoride and boron oxide.

Table I

| Example | LaF₃ | | BO₁.₅ | | F/B | $n_D$ | $\nu$ |
|---|---|---|---|---|---|---|---|
| | W | M | W | M | | | |
| I-1 | 60 | 21.0 | 40 | 79.0 | 0.80 | 1.7199 | 56.6 |
| I-2 | 61 | 21.6 | 39 | 78.4 | 0.83 | 1.7342 | 55.1 |

The second table gives eleven examples of the ternary system $CaF_2$—$LaO_{1.5}$—$BO_{1.5}$:

Table II

| Example | CaF₂ | | LaO₁.₅ | | BO₁.₅ | | F/B | $n_D$ | $\nu$ |
|---|---|---|---|---|---|---|---|---|---|
| | W | M | W | M | W | M | | | |
| II-1 | 3 | 2.6 | 59 | 24.3 | 38 | 73.2 | 0.07 | 1.7265 | 54.8 |
| II-2 | 11 | 10.5 | 60 | 27.4 | 29 | 62.1 | 0.34 | 1.7191 | 55.6 |
| II-3 | 16 | 14.7 | 54 | 23.7 | 30 | 61.6 | 0.48 | 1.6955 | 57.4 |
| II-4 | 22 | 19.3 | 47 | 19.7 | 31 | 61.0 | 0.63 | 1.6540 | 61.0 |
| II-5 | 23 | 20.1 | 46 | 19.2 | 31 | 60.7 | 0.66 | 1.6637 | 59.5 |
| II-6 | 23 | 21.4 | 50 | 22.3 | 27 | 56.3 | 0.76 | 1.6759 | 58.0 |
| II-7 | 24 | 21.5 | 47 | 20.2 | 29 | 58.3 | 0.74 | 1.6823 | 56.9 |
| II-8 | 24 | 23.3 | 52 | 24.3 | 24 | 52.4 | 0.89 | 1.711 | 56.5 |
| II-9 | 25 | 20.4 | 40 | 15.7 | 35 | 64.0 | 0.64 | 1.636 | 63.0 |
| II-10 | 30 | 23.9 | 35 | 13.4 | 35 | 62.7 | 0.76 | 1.6394 | 61.6 |
| II-11 | 40 | 26.0 | 12 | 3.8 | 48 | 70.2 | 0.74 | 1.6043 | 64.5 |

Figure 1 is a ternary diagram showing the region of glass formation of the system exemplified in Table II in both weight and "cationic" or "mole" per cent, the former being shown in a solid line and the latter in a broken line. These boundary lines are arbitary because glass formation is a function of experimental conditions, such as the size of the melt, rate of cooling, shape of the vessel and of the mold, temperatures of the melt during pouring, and temperature of the mold, but they serve to indicate the general region as observed experimentally.

The third table gives two examples of the system $SrF_2$—$LaO_{1.5}$—$BO_{1.5}$.

Table III

| Example | $SrF_2$ | | $LaO_{1.5}$ | | $BO_{1.5}$ | | F/B | $n_D$ | $\nu$ |
|---|---|---|---|---|---|---|---|---|---|
| III-1 | 6 | 3.3 | 57 | 24.0 | 37 | 72.7 | 0.09 | | |
| III-2 | 40 | 17.0 | 7.5 | 2.5 | 52.5 | 80.5 | 0.42 | 1.6079 | 64.0 |

Figure 2:
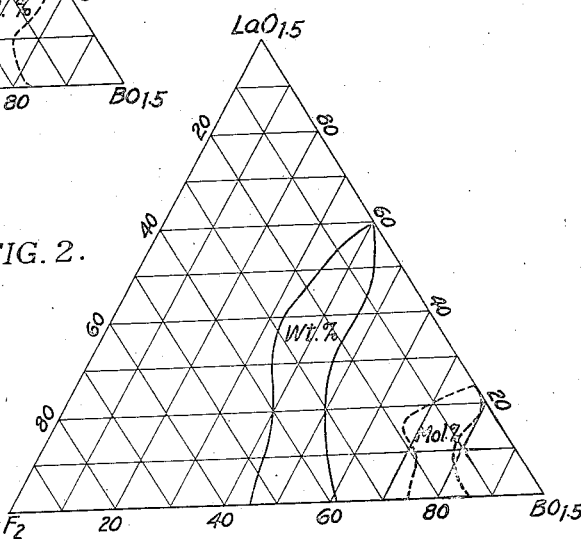

Figure 2 is a ternary diagram showing the region of glass formation of the system shown in Table III, the remarks concerning Figure 1 being equally pertinent.

The fourth table gives seven examples of the system $BaF_2$—$LaO_{1.5}$—$BO_{1.5}$.

Table IV

| Example | $BaF_2$ | | $LaO_{1.5}$ | | $BO_{1.5}$ | | F/B | $n_D$ | $\nu$ |
|---|---|---|---|---|---|---|---|---|---|
| IV-1 | 5 | 2.0 | 58 | 24.6 | 37 | 73.4 | 0.05 | 1.7302 | 54.6 |
| IV-2 | 18 | 7.9 | 51 | 24.0 | 31 | 68.1 | 0.23 | 1.7044 | 56.6 |
| IV-3 | 19 | 7.8 | 48 | 21.8 | 33 | 70.2 | 0.23 | 1.7062 | 56.3 |
| IV-4 | 19 | 8.3 | 50 | 23.5 | 31 | 68.2 | 0.24 | 1.708 | 58.5 |
| IV-5 | 37 | 13.4 | 20 | 7.8 | 43 | 78.7 | 0.34 | 1.62 | |
| IV-6 | 41 | 21.9 | 38 | 21.8 | 21 | 56.3 | 0.78 | 1.6668 | 58.9 |
| IV-7 | 50 | 19.1 | 10 | 4.1 | 40 | 76.9 | 0.50 | 1.604 | 63.0 |

Figure 3:
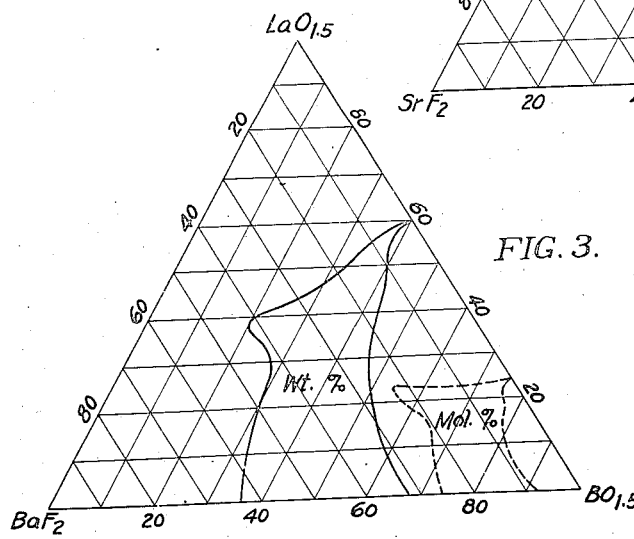

Figure 3 is a ternary diagram showing the region of glass formation for the system exemplified in Table IV, the remarks as to Figure 1 being also pertinent here. Analogous charts could be made for the other ternary systems disclosed.

The fifth table gives two examples of the system $LaF_3$—$LaO_{1.5}$—$BO_{1.5}$.

Table V

| Example | $LaF_3$ | | $LaO_{1.5}$ | | $BO_{1.5}$ | | F/B | $n_D$ | $\nu$ |
|---|---|---|---|---|---|---|---|---|---|
| V-1 | 20 | 6.8 | 40 | 16.4 | 40 | 76.8 | 0.27 | 1.7143 | 56.8 |
| V-2 | 12 | 4.5 | 54 | 24.2 | 34 | 71.3 | 0.19 | 1.7249 | 55.2 |

The sixth table gives a single example of the system $ThF_4$—$LaO_{1.5}$—$BO_{1.5}$.

Table VI

| Example | $ThF_4$ | | $LaO_{1.5}$ | | $BO_{1.5}$ | | F/B | $n_D$ | $\nu$ |
|---|---|---|---|---|---|---|---|---|---|
| VI-1 | 20 | 5.1 | 48 | 23.0 | 32 | 72.0 | 0.28 | 1.7501 | 54.2 |

Although alkali fluorides are not preferred, an example is given of the system $LiF$—$LaO_{1.5}$—$BO_{1.5}$

Table VII

| Example | LiF | | $LaO_{1.5}$ | | $BO_{1.5}$ | | F/B | $n_D$ | $\nu$ |
|---|---|---|---|---|---|---|---|---|---|
| VII-1 | 15 | 30.6 | 50 | 16.2 | 35 | 53.2 | 0.58 | 1.636 | 60 |

The eighth table gives three examples including a mixture of two fluorides with lanthanum and boron oxides.

Table VIII

| Example | $CaF_2$ | | $BaF_2$ | | $LaF_3$ | | $ThF_4$ | | $LaO_{1.5}$ | | $BO_{1.5}$ | | F/B | $n_D$ | $\nu$ |
|---|---|---|---|---|---|---|---|---|---|---|---|---|---|---|---|
| VIII-1 | | | 4 | 1.6 | 20 | 7.0 | | | 38 | 16.1 | 38 | 75.3 | 0.32 | 1.7098 | 56.8 |
| VIII-2 | | | 4 | 1.8 | | | 19 | 4.8 | 45 | 21.6 | 32 | 71.8 | 0.32 | 1.7400 | 54.9 |
| VIII-3 | 5 | 4.9 | | | 10 | 3.9 | | | 55 | 25.6 | 30 | 65.6 | 0.33 | | |

The ninth table gives eight examples including the fluorides of calcium, strontium, and barium with lanthanum, thorium, and boron oxides.

Table IX

| Example | $CaF_2$ | | $SrF_2$ | | $BaF_2$ | | $LaO_{1.5}$ | | $ThO_2$ | | $BO_{1.5}$ | | F/B | $n_D$ | $\nu$ |
|---|---|---|---|---|---|---|---|---|---|---|---|---|---|---|---|
| IX-1 | 0.5 | 0.5 | 0.7 | 0.5 | 18.3 | 9.0 | 22.7 | 12.0 | 30.6 | 10.0 | 27.2 | 68.0 | 0.29 | 1.722 | 55.2 |
| IX-2 | 0.5 | 0.5 | 0.8 | 0.5 | 20.2 | 9.0 | 41.7 | 20.0 | 6.8 | 2.0 | 30.0 | 68.0 | 0.29 | 1.7076 | 56.5 |
| IX-3 | 3.9 | 4.0 | 4.7 | 3.0 | 6.5 | 3.0 | 26.3 | 13.0 | 29.4 | 9.0 | 29.2 | 68.0 | 0.29 | 1.7210 | 55.7 |
| IX-4 | 4.0 | 3.8 | 5.0 | 3.0 | 7.0 | 3.0 | 39.0 | 18.2 | 14.0 | 4.0 | 31.0 | 67.9 | 0.29 | 1.7073 | 56.5 |
| IX-5 | 7.0 | 6.3 | 8.0 | 4.5 | 17.0 | 6.8 | 27.0 | 11.7 | 7.0 | 1.9 | 34.0 | 68.8 | 0.51 | 1.650 | 61.7 |
| IX-6 | 7.9 | 8.0 | 9.5 | 6.0 | 11.1 | 5.0 | 31.0 | 15.0 | 13.3 | 4.0 | 27.2 | 62.0 | 0.61 | 1.6776 | 58.7 |
| IX-7 | 7.8 | 8.0 | 10.7 | 7.0 | 10.7 | 5.0 | 33.0 | 17.0 | 12.9 | 4.0 | 24.9 | 59.0 | 0.68 | | |
| IX-8 | 21.8 | 16.0 | 4.4 | 2.0 | 3.1 | 1.0 | 22.7 | 8.0 | 4.6 | 1.0 | 43.4 | 72.0 | 0.53 | 1.630 | |

The tenth table includes two examples of lanthanum fluoride with boron oxide and an oxide other than lanthanum.

Table X

| Example | $LaF_3$ | | BeO | | BaO | | $BO_{1.5}$ | | F/B | $n_D$ | $\nu$ |
|---|---|---|---|---|---|---|---|---|---|---|---|
| X-1 | 65 | 23.6 | 6 | 17.1 | | | 29 | 59.3 | 1.19 | 1.691 | 58.0 |
| X-2 | 50 | 20.4 | | | 20 | 10.4 | 30 | 69.1 | 0.89 | 1.680 | 59.0 |

In the eleventh table are given eight examples including a fluoride and boron oxide and two or more other oxides.

Table XI

| Example | LaF₃ | | ThF₄ | | LaO₁.₅ | | TiO₂ | | ThO₂ | | CbO₂.₅ | | TaO₂.₅ | | BO₁.₅ | | F/B | $n_D$ | $\nu$ |
|---|---|---|---|---|---|---|---|---|---|---|---|---|---|---|---|---|---|---|---|
| XI-1 | 26 | 15.7 | | | 16 | 11.6 | | | 16 | 7.2 | | | 27 | 14.5 | 15 | 51.0 | 0.92 | 1.8832 | 40.2 |
| XI-2 | 16 | 9.6 | | | 29 | 20.7 | | | 20 | 8.9 | | | 20 | 10.6 | 15 | 50.2 | 0.57 | 1.8505 | 43.6 |
| XI-3 | | | 22 | 7.1 | 46 | 28.2 | 15 | 18.8 | | | | | | | 16 | 45.9 | 0.62 | 1.9048 | 31.8 |
| XI-4 | | | 20 | 7.0 | 42 | 27.8 | | | | | 23 | 18.7 | | | 15 | 46.5 | 0.60 | 1.9148 | 33.8 |
| XI-5 | | | 19 | 6.2 | 42 | 25.9 | | | | | 21 | 15.9 | | | 18 | 52.0 | 0.48 | 1.8902 | 35.3 |
| XI-6 | | | 17 | 6.3 | 37 | 25.9 | | | | | | | 30 | 15.5 | 16 | 52.4 | 0.48 | 1.886 | 39.0 |
| XI-7 | | | 17 | 6.0 | 46 | 30.8 | | | | | | | 20 | 9.9 | 17 | 53.3 | 0.45 | 1.8544 | 43.4 |
| XI-8 | | | 20 | 7.5 | 45 | 32.0 | | | | | | | 20 | 10.5 | 15 | 49.9 | 0.60 | 1.8521 | 43.3 |

It is to be noticed that this group, while within the scope of my invention, is marked by a smaller percentage of boron oxide than those of the previous tables, a rather low percentage of fluoride, the presence of lanthanum and one or more of tantalum, columbium, titanium, and thorium in considerable quantities, and that they have a value of $n_D$ in the range between 1.85 and 1.92 and of $\nu$ between 30 and 45.

Figure 4:
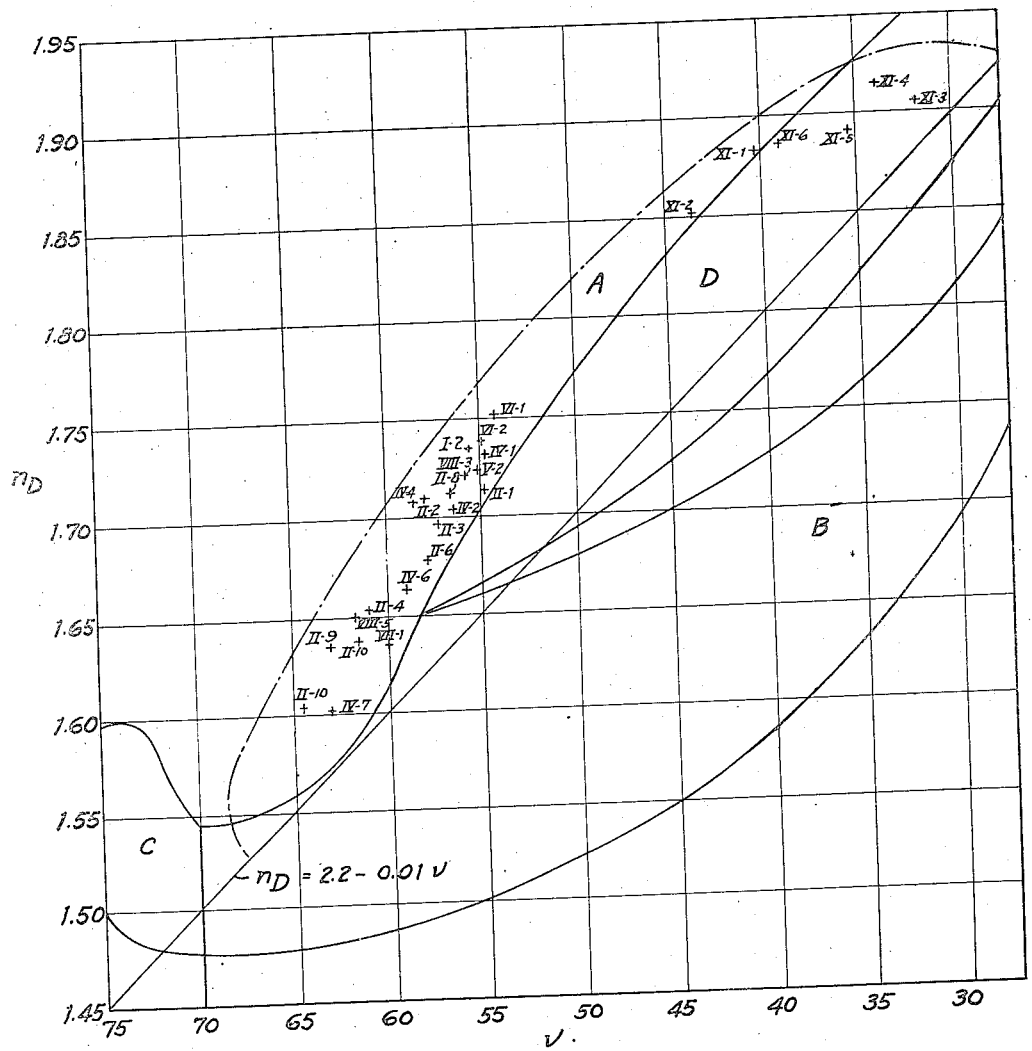

Figure 4 is a chart on which refractive index, $n_D$ is plotted against Abbe value, $\nu$. On account of their number, all the examples are not shown, but a sufficient number are indicated by their example numbers to show the approximate region A wherein they fall. For purposes of comparison, the region for the most commonly available commercial glass is indicated by area B, that of fluophosphate glasses by area C, and rare-element borate glasses by D. It is to be noted that the region A for the present glasses includes higher $n_D$ values for the corresponding $\nu$ values in the region between 54 and 68 than any of the others. It is to be further understood that the indicated boundaries of all these regions are approximate and not exact delimitations, and that the areas do in fact somewhat overlap.

It is to be noted that all the values of $n_D$, although extending from 1.55 to 1.92, lie above a line passing through the points ($\nu=70$, $n_D=1.50$) and ($\nu=30$, $n_D=1.90$) and defined by the equation $n_D=2.2-0.01\nu$, or $\nu=220-100\, n_D$.

The group of glasses having a $\nu$ value between 68 and 54 are of particular value because their values of $n_D$ are in most cases higher for the corresponding $\nu$ value than those of any previous glass known to me.

Certain additional properties for some of the examples are given in Tables XII and XIII. Table XII gives the partial dispersions between certain lines of the spectrum, and Table XIII gives the partial dispersion ratios between certain lines, for two wave lengths: $\lambda_1$, $\lambda_2$, $$\nu_{\lambda_1\lambda_2}=\frac{n_{\lambda_1}-n_{\lambda_2}}{n_F-n_C}$$

Table XII

| Example | $n_F-n_C$ | $n_m-n_\lambda$ | $n_h-n_g$ | $n_g-n_F$ | $n_F-n_D$ | $n_J-n_C$ | $n_S-n_{A'}$ |
|---|---|---|---|---|---|---|---|
| I-6 | 0.01271 | | 0.00577 | 0.00695 | 0.00896 | 0.00691 | |
| II-2 | .01293 | | | .00704 | .00913 | .00702 | |
| II-4 | .01073 | | .00476 | .00577 | .00754 | .00586 | 0.00796 |
| IV-2 | .01244 | 0.00966 | .00562 | .00676 | .00879 | .00673 | |
| V-2 | .01313 | | .00595 | .00710 | .00927 | .00710 | |
| IX-5 | .01054 | | | .00578 | .00736 | .00585 | |
| X-1 | .00834 | | | .00444 | .00584 | .00455 | |

Table XIII

| Example | $\nu_{m\lambda}$ | $\nu_{h g}$ | $\nu_{gF}$ | $\nu_{FD}$ | $\nu_{eC}$ | $\nu_{DA'}$ |
|---|---|---|---|---|---|---|
| I-1 | | 0.454 | 0.547 | 0.705 | 0.544 | |
| II-2 | | | .543 | .706 | .543 | |
| II-4 | | .444 | .538 | .703 | .546 | 0.640 |
| IV-2 | 0.777 | .452 | .544 | .706 | .541 | |
| V-2 | | .453 | .541 | .706 | .541 | |
| IX-5 | | | .548 | .698 | .555 | |
| X-1 | | | .532 | .700 | .546 | |

Although the illustrative examples are predominantly simple cases, it is well known that the introduction of small amounts of various compatible ingredients or constituents usually helps to prevent devitrification or other phase separation and to increase chemical durability of the glass. A slight addition of other compounds should not, therefore, be considered as a deviation from this invention. Likewise, any component may be partially or completely replaced atomically by an equivalent amount of a chemically similar component. The possibility of various combinations of compositions is, therefore, enormous and is impossible to be covered in a few examples. It is also to be noted that various substances or compounds may be used in the batch so that the final glass will contain the same amount of the ingredients originally intended.

Although many fluorides may be used, the fluorides of calcium, strontium, barium, lanthanum, and thorium are found to be particularly useful. The ease of melting the batches increases successively in batches containing, respectively, $CaF_2$, $SrF_2$, and $BaF_2$. For batches containing lanthanum, thorium, and other oxides the melting temperatures increase as the "molecular" amounts of these oxides increase. The high fluoride and boron oxide contents usually lower the melting temperatures.

In making these glasses, it is important that fluorides are not introduced with batch materials which give off water vapor or other gases during melting. Since boric acid, $H_3BO_3$, which gives off a large amount of water vapor on heating, is the common source for the boron oxide component, the melting of fluoborate glasses may be carried out in either of the following two ways:

In the first method, boric acid may be heated with other oxide components, such as lanthanum oxide, etc., at a low temperature (about 250° C. for lanthanum oxide-boric acid mixture) to react for 10 or 20 hours so that all the water contents are driven away. The temperatures used should be as low as possible in order that the final product is not too hard to grind. The powder may be ground in a ball mill with flint balls. Proper amounts of fluorides are then introduced and well mixed. The mixture is melted down to a clear and fluid liquid in a platinum crucible or beaker at about 950–1250° C.

The alternative and preferable method is to melt down, first, all the batch materials without fluorides. This usually can be done at about 1200–1300° C. A still higher temperature may be used to hasten the melting. Sometimes two layers of liquids may result. The fluorides are then added while the liquid layers are stirred with a platinum stirrer. The fluorides dissolve readily, and a uniform and clear liquid will result in a short time. The temperature can then be lowered somewhat. This method is preferable, because it does not involve the process of grinding of the oxide mixtures which may introduce impurities in the batch; and also because it provides a rapid means for fluorides to react with the oxide components to form a uniform and clear melt in a short time.

In general, it takes about one and one half hours to melt down the oxide components of a 500-gram melt to fluid liquid or liquids at about 1250° C. The solution of fluorides takes about 10 minutes with stirring. The liquid glass is usually fluid at about 1200° C. At this temperature the volatilization loss is almost unnoticeable. However, it would be best to cover the melting pot during melting and stirring period. The glass can be poured after about one half hour's stirring at somewhat lower temperature. The best molding temperatures are between 450–650° C., though 550° C. would be suitable for most cases. These glasses are colorless and durable against moisture attack.

Although valuable results are obtained when the percentage of fluoride is small, it is to be noted that in most of the examples given the cationic percentage of fluoride is greater than 17, and this is preferable, particularly when the system is a simple one, as in Tables I, VII, and X, and in most of the examples of Tables II, III, and IV. While the atomic ratio of fluorine to boron may be very small, as is shown for some of the examples, it lies in most cases, and preferably, between 0.4 and 1.3.

It is to be understood that numerous variations in proportions and ingredients can be made within the scope of the claims. For instance, although Table X is given expressly for the purpose of showing examples without lanthanum oxide as an original ingredient, it could be added to them.

When, in the following claims, the expression "fluoride selected from the fluorides" is used, it does not mean "a fluoride," but includes one or several fluorides.

Having thus described my invention, what I claim is:

1. A glass resulting from a batch comprising in cationic percentage boron oxide, 45 to 90 per cent; lanthanum oxide, 1 to 28 per cent; and fluoride, 1 to 31 per cent, said glass having an $n_D$ value greater than 2.2–0.01 $\nu$.

2. A glass resulting from a batch comprising in cationic percentage boron oxide, 45 to 90 per cent; lanthanum oxide, 1 to 32 per cent; the boron and lanthanum oxides together totaling at least 50 per cent; and fluoride, 1 to 31 per cent; said glass having an $n_D$ value greater than 2.2–0.01 $\nu$.

3. A fluoborate glass resulting from a batch comprising in per cent by weight boron oxide, 15 to 20 per cent; lanthanum oxide, 15 to 50 per cent; at least one oxide selected from the oxides of titanium, thorium, columbium, tantalum, 15 to 30 per cent; and a fluoride of a non-alkali metal.

4. A fluoborate glass resulting from a batch comprising in per cent by weight boron oxide, 15 to 20 per cent; lanthanum oxide, 15 to 50 per cent; at least one oxide selected from the oxides of titanium, thorium, columbium, tantalum, 15 to 30 per cent; and a fluoride of a non-alkali metal, the atomic ratio of fluorine to boron being between 0.4 and 1.3, and the glass having a value for $n_D$ greater than 2.2–0.01 $\nu$.

5. A fluoborate glass resulting from a batch comprising in per cent by weight boron oxide, 15 to 68 per cent; lanthanum oxide, 1 to 60 per cent; and fluoride; and having a value of $n_D$ greater than 2.2–0.01 $\nu$.

6. Fluoborate glass having an Abbe value between 54 and 68 and a value for $n_D$ greater than 2.2–0.01 $\nu$ and resulting from a batch comprising in per cent by weight boron oxide, 20 to 68 per cent; lanthanum oxide, 1 to 60 per cent; and fluoride over 3 per cent.

7. Fluoborate glass having an Abbe value between 54 and 68 and a value for $n_D$ greater than 2.2–0.01 $\nu$ and resulting from a batch comprising in per cent by weight, boron oxide, 20 to 53 per cent; lanthanum oxide, 7 to 60 per cent; and fluoride, 15 to 40 per cent.

8. Fluoborate glass having an Abbe value between 54 and 68 and a value for $n_D$ greater than 2.2–0.01 $\nu$ and resulting from a batch comprising in per cent by weight, boron oxide, 20 to 53 per cent; lanthanum oxide, 7 to 60 per cent; thorium oxide, 4 to 31 per cent; and fluoride, 15 to 40 per cent.

9. Fluoborate glass having an Abbe value between 54 and 68 and a value for $n_D$ greater than 2.2–0.01 $\nu$ and resulting from a batch comprising in per cent by weight, boron oxide, 20 to 53 per cent; lanthanum oxide, 7 to 60 per cent; thorium oxide, 0 to 31 per cent; calcium fluoride, 0 to 40 per cent; strontium fluoride, 0 to 40 per cent; and barium fluoride, 0 to 50 per cent, the fluorides totaling 15 to 50 per cent.

10. Fluoborate glass having an Abbe value between 54 and 68 and a value for $n_D$ greater than 2.2–0.01 $\nu$ and resulting from a batch comprising in cationic per cent, boron oxide (considered as $BO_{1.5}$), 56 to 81 per cent; lanthanum oxide ($LaO_{1.5}$), 2 to 27 per cent; thorium oxide, 0 to 10 per cent; barium fluoride, 0 to 22 per cent; strontium fluoride, 0 to 17 per cent; calcium fluoride, 0 to 26 per cent, the fluorides totaling 1 to 26 per cent.

11. Fluoborate glass having an Abbe value between 54 and 68 and a value for $n_D$ greater than 2.2–0.01 $\nu$ and resulting from a batch comprising in per cent by weight, boron oxide, 20 to 65 per cent; lanthanum oxide, 1 to 60 per cent; and fluoride, 1 to 60 per cent.

KUAN-HAN SUN.

REFERENCES CITED

The following references are of record in the file of this patent:

UNITED STATES PATENTS

| Number | Name | Date |
|---|---|---|
| Re. 13,766 | Macbeth | July 7, 1914 |
| 1,143,788 | Schnelbach | June 22, 1915 |
| 1,327,569 | Peregrine | Jan. 6, 1920 |
| 1,529,259 | Locke et al. | Mar. 10, 1925 |
| 1,623,301 | Brenner | Apr. 5, 1927 |
| 1,971,309 | Fuwa | Aug. 21, 1934 |
| 2,056,627 | Smelt | Oct. 6, 1936 |
| 2,255,109 | Fischer | Sept. 9, 1941 |
| 2,262,951 | Lyle | Nov. 18, 1941 |
| 2,269,176 | Booth et al. | Jan. 6, 1942 |
| 2,272,747 | Hull et al. | Feb. 10, 1942 |

(Other references on following page)

UNITED STATES PATENTS

| Number | Name | Date |
|---|---|---|
| 2,282,601 | Blaw | May 12, 1942 |
| 2,334,961 | Schoenlaub | Nov. 23, 1943 |
| 2,393,449 | Armistead | Jan. 22, 1946 |
| 2,394,502 | Weyl et al. | Feb. 5, 1946 |
| 2,397,195 | Mook et al. | Mar. 26, 1946 |

FOREIGN PATENTS

| Number | Country | Date |
|---|---|---|
| 8,704 | Great Britain | 1907 |
| 492,960 | Great Britain | 1938 |

OTHER REFERENCES

Ser. No. 395,364, Berger et al. (A. P. C.), pub. May 11, 1943.

Certificate of Correction

Patent No. 2,456,033.                                                                December 14, 1948.

KUAN-HAN SUN

It is hereby certified that errors appear in the printed specification of the above numbered patent requiring correction as follows:

Column 2, line 38, Table I, last column thereof, for the indistinct numeral read *55.1*; column 4, in the line preceding Table IX, and same column, in the paragraph following same Table IX, second and third lines thereof, for "lauthanum" read *lanthanum*; column 5, Table XII, in the heading, for

| $n_F - n_D$ | $n_I - n_C$ | $nS - n_{A'}$ |
|---|---|---| read

| $n_F - n_D$ | $n_e - n_C$ | $n_D - n_{A'}$ |
|---|---|---| same table, first column thereof, under "Example", for "I-6" read *I-1*; and that the said Letters Patent should be read with these corrections therein that the same may conform to the record of the case in the Patent Office.

Signed and sealed this 10th day of May, A. D. 1949.

[SEAL]

THOMAS F. MURPHY,
*Assistant Commissioner of Patents.*